United States Patent
Lee et al.

(10) Patent No.: US 9,455,985 B2
(45) Date of Patent: Sep. 27, 2016

(54) METHOD FOR SECURE KEY INJECTION WITH BIOMETRIC SENSORS

(71) Applicant: Apple Inc., Cupertino, CA (US)

(72) Inventors: Jeffrey C. Lee, Rockledge, FL (US); Andrew R. Whalley, San Francisco, CA (US); Craig A. Marciniak, San Jose, CA (US)

(73) Assignee: Apple Inc., Cupertino, CA (US)

( * ) Notice: Subject to any disclaimer, the term of this patent is extended or adjusted under 35 U.S.C. 154(b) by 185 days.

(21) Appl. No.: 14/502,960

(22) Filed: Sep. 30, 2014

(65) Prior Publication Data

US 2016/0094548 A1    Mar. 31, 2016

(51) Int. Cl.
*G06F 21/32* (2013.01)
*H04L 29/06* (2006.01)

(52) U.S. Cl.
CPC ................... *H04L 63/0861* (2013.01)

(58) Field of Classification Search
CPC ..... H04L 9/08; H04L 9/3226; H04L 9/3234; H04N 21/4367; G06F 21/31
See application file for complete search history.

(56) References Cited

U.S. PATENT DOCUMENTS

| 2010/0138667 | A1* | 6/2010 | Adams | G06F 21/32 713/186 |
| 2015/0067348 | A1* | 3/2015 | Webber | G06F 21/32 713/186 |
| 2015/0095654 | A1* | 4/2015 | Li | H04L 9/0866 713/186 |

* cited by examiner

*Primary Examiner* — Izunna Okeke
(74) *Attorney, Agent, or Firm* — Blakely, Sokoloff, Taylor & Zafman LLP

(57) ABSTRACT

Systems and methods are disclosed for securely injecting one or more key values into an electronic device by reading with a fingerprint sensor a manufactured key device having a key value. A secure communication channel between a fingerprint sensor and a secure processing system enables the reading, processing, and storing of the fingerprint sensor data from the key device. The key device includes a conductive substantially planar substrate ("substrate") with raised conductive portions configured to encode a key value. The substrate can be made from a non-conductive material and have conductive material applied to the substrate to encode the key value. The substrate can be covered with an opaque, conductive layer so that the encoding cannot be visually perceived. The encoding scheme can be a QR code, a bar code, an image, an alphanumeric string, or other encoding. One or more electronic device access policies can be associated with a key value to control how an electronic device can be used when the electronic device is accessed with the manufactured key device.

20 Claims, 15 Drawing Sheets

METHOD FOR SECURE KEY INJECTION WITH BIOMETRIC SENSORS

TECHNICAL FIELD

This disclosure relates to the field of securing access to, and utilization of, an electronic device.

BACKGROUND

Computing devices, cell phones and other electronic devices can store personal, private, and valuable information that a user of the device would like to keep secure. Current methods of securing access to the operation and contents of an electronic device include the user entering a personal identification number (PIN), the user entering a password, the user making a particular gesture upon a touch screen, such as a swipe motion, and a user pressing a fingertip into a fingerprint sensor. PINs and passwords (collectively, "access keys") require that the user remember the access key and enter the access key to access the electronic device. It is well-known that a longer and more random access key offers better security than a shorter or more easily-guessed access key. However, long and random access keys are hard to remember and inconvenient to enter. Further, it is more likely that a user will make an error entering a long access key than a shorter one, thus requiring that the user re-enter the access key. Biometric sensors, such as fingerprint sensors, have been used to overcome some of the problems associated with using a long access key to secure an electronic device. However, fingerprint scanning is not deterministic as is a manually-entered access key. A fingerprint sensor scans a fingerprint and generates a sensor signal representing the fingerprint. The sensor signal is subjected to signal processing techniques including removal of signal artifacts in the sensor signal, normalization of the sensor signal, extracting of a set of features from the sensor signal that represent the fingerprint, and creating and storing a template of features to represent the fingerprint. Thus, the signal processing of a scanned fingerprint results in an approximation of the fingerprint signal data, not in an exact fingerprint image. A fingerprint scanning system must determine whether a scanned fingerprint sufficiently matches the stored approximation of the fingerprint signal data to permit access to the functionality and data of the electronic device. In addition, since the stored template of features are an approximation of the fingerprint of the user, a fingerprint system may have false acceptances of a fingerprint that is not the user's and may also have false rejections of a fingerprint that is the fingerprint of the user. Further, a human finger may leave a detectable image of the user's fingerprint on the fingerprint sensor or other objects. The detectable image can be recovered and used by another to gain unauthorized access the user's electronic device. A fingerprint, or other biometric identification scheme, also limits the utility of the electronic device by requiring the physical presence of the authorized user of the electronic device to provide the biometric information required to access the electronic device. For example, a user of an electronic device would not be able to lend her electronic device temporarily to a person whom the user trusts because access to the electronic device is limited by the user's biometric identification, requiring the presence of the user to access the electronic device. Alternatively, the user would have to give her PIN or password to the person to whom she lends the electronic device so that the person could access and utilize the electronic device. But, giving the person borrowing the electronic device the user's PIN or password would then give full access to the functionality and data of the electronic device to the person borrowing the electronic device, causing a privacy and security risk to the owner of the electronic device.

SUMMARY OF THE DESCRIPTION

Embodiments are described for securely injecting one or more key values into one or more electronic devices and for registering the one or more key values with a user account. An electronic device can include a fingerprint sensor that is securely communicatively coupled to a secure processing system that can receive fingerprint sensor data from the fingerprint sensor. A key value can be encoded on manufactured key device that can be securely read by the fingerprint sensor, processed by the secure processing system and stored in a secured storage. Once stored, the one or more key values can be used for securely communicating between electronic devices and between electronic devices and one or more online user accounts. The one or more key values can further be used for user authentication and access control to the electronic device, and for controlling the functionality of the device by associating one or more device utilizing policies with a key value.

In an embodiment, a manufactured key device (or "key device") can encode a key value. In an embodiment, a manufactured key device can encode a plurality of key values. The encoding can include a Quick Response (QR) code, a bar code, a numeric code, an alphabetic code, an alphanumeric code, a graphical image, a proprietary code, or a combination of these. The key value can be encoded on a substantially planar conductive surface that can be scanned by a biometric sensor, such as a fingerprint sensor, on an electronic device. The key value can be etched into the conductive layer or built-up from application of a conductive material, e.g., a conductive ink, or a combination of etching and building up of a conductive material. The key device can be configured to be received by the fingerprint sensor. A portion of the key device can be configured to contact a conductive area on the fingerprint sensor to trigger scanning of the key device by the fingerprint sensor. In an embodiment, the key device can have an opaque conductive layer or non-conductive layer over the substantially planar surface such that the encoded key value cannot be optically perceived or photographed, but the key value can still be scanned by the fingerprint sensor. The opaque conductive layer may have a non-conductive grid pattern within the conductive layer to preserve the electrical image of the key value encoding information as it passes through the opaque conductive layer to the fingerprint sensor. A key device can be affixed to a physical object for convenience in handling, for aesthetic purposes, e.g. on a charm bracelet, ring, or necklace, or for easy access or storage, such as on a key chain. A key device can have a notch, tab, or other physical orientation feature for use in orienting the key device with the fingerprint sensor. Alternatively, or in addition, the key device may contain an orientation information on the key device, such as a QR code, so that the user does not need to manually orient the key device relative to the fingerprint sensor. In an embodiment, the orientation information may be in an encoded form.

In another embodiment, a method of reading a key value encoded on a manufactured key device can include initially gaining secure access to an electronic device and setting the electronic device into a mode for reading the key device. A user can be prompted to place the key device on the fingerprint sensor. Alternatively, after a user has securely accessed the electronic device, the electronic device can be configured to automatically enter a mode for reading the key device when the key device is placed on the fingerprint sensor. A conductive area on the fingerprint sensor can be configured to detect the presence of the key device at the fingerprint sensor. The key device can then be scanned by the fingerprint sensor, producing fingerprint sensor data. The method can determine whether the fingerprint sensor data indicates the presence of a fingerprint or indicates the presence of a manufactured key device. If the fingerprint sensor data indicates the presence of a human finger, not a manufactured key device, then the fingerprint sensor data can be filtered or processed by known signal processing techniques used to generate a template for a fingerprint. If the fingerprint sensor data indicates that a key device, not a human finger, has been placed upon the fingerprint sensor, then a secure processing system can determine a type of the key device, such as a bar code, a QR code, an alphanumeric code, a graphical image, or other encoding. The fingerprint sensor data may be processed using signal processing that is specific to the type of the key device. The secure processor can determine a cryptographic key from the fingerprint sensor data and store a key value determined from the fingerprint sensor data. In an embodiment, the key value can be used as a cryptographic key. In an embodiment, a cryptographic key can be determined from the key value. A user can similarly inject the key value into other electronic devices of the user.

In yet another embodiment, after a key value has been securely injected into an electronic device, the key value can be associated with an electronic device access and control policy. For example, a user may want to lend her phone (or other electronic device) to a friend, but does not want the friend to make purchases with the phone, and does not want the friend to view her private information such as contacts, emails, texts, voicemails, and user account information that may be stored on the phone. The user may simply want to be able to temporarily grant her friend the ability to send and receive a few texts, use a map application, and make a limited number of local phone calls. The user can configure a device access policy to control access to data, applications, and functionality of her phone and associate the policy with a key value of a manufacture key device. After associating the policy with a key value that can be obtained from the key device, the user can lend her friend the phone and the key device having the key value. The friend places the key device on the fingerprint sensor to access the phone in accordance with the policy set by the user for her friend's temporary use of the phone.

In yet another embodiment, a user can register a key value with a user account or a plurality of user accounts. The user account controls access to services available through the user account. The user can securely inject the key value into the electronic device, as described above. Then, the user can log onto the user account and follows a procedure for registering the key value with the user account service. The user can then associate a service access policy with the key value. For example, the user account may have access to services such as media services, cloud storage, an application store, online purchasing, a backup and restore service, or a device synchronization service. A user, who is a parent of a family having multiple electronic devices, may want to register a particular key value with the user account. The key value can be injected into each of the multiple electronic devices. The parent may then associate a policy with the key value that controls which services may be accessed, and may impose limits on access, by each electronic device having the key value. For example, the parent user may authorize limited purchases of food and transportation per day. The parent user may also limit purchases of non-food items to a certain dollar value per purchase, per day, or both. The parent user may also want to limit access to software updates, or backup and restore services, so that only the parent user utilizes those services via the user account.

In another embodiment, multiple electronic devices each having learned a key value can securely communicate with each other by using the key value as a cryptographic key. Secure communications can include encrypted phone call cell packets, encrypted email and text messages, and encrypted data transmissions. The multiple devices can also each securely access services via a user account that has the key value registered with the user account.

In still another embodiment, a user securely provision a new (second) electronic device from an old (first) electronic device by securely injecting a key value into the old electronic device and injecting the key value into the new electronic device. The two devices can then establish as secure communication channel using the key value as a cryptographic key. Applications, settings, and data of the old electronic device can be used to provision the new electronic device via the secure communications channel. If the user also registers the key value with a user account that includes a backup and restore service, then the old and new electronic devices can establish a secure communication channel with the user account and provision the new electronic device from the old electronic device via the secure communication channel and the backup and restore service.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for securely injecting a key value into an electronic device to access the device and to establish secure communications with devices and services that have learned the key value. Once learned, the key may be associated with one or more access policies on the electronic device and one more access policies associated with the key value and a user account that is used to access services.

Figure 1:
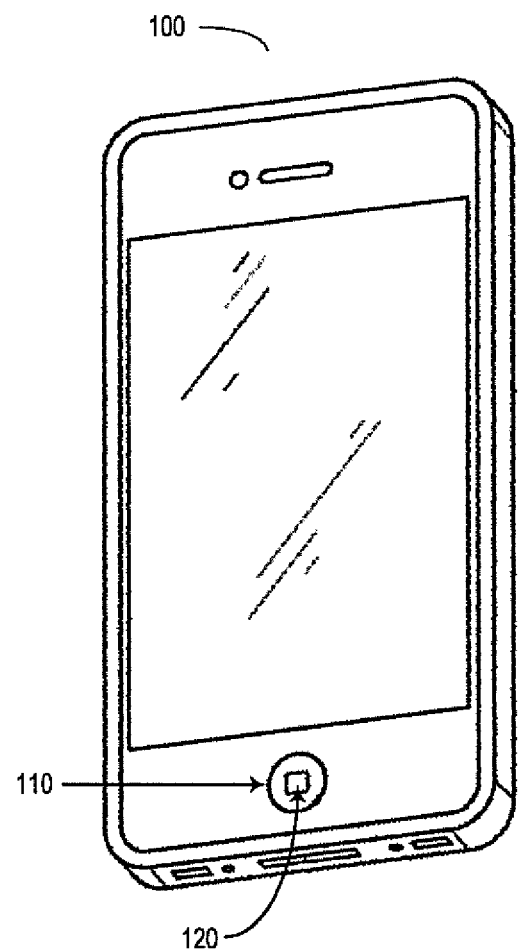
FIG. 1 illustrates an exemplary electronic device for use with embodiments described herein.

FIG. 1 illustrates an exemplary electronic device 100 for use with embodiments described herein. The electronic device 100 comprises a fingerprint sensor 120 and a conductive ring 110. The conductive ring 110 can detect the presence of a human finger or a manufactured key device. The detection can be used to trigger reading of the fingerprint sensor 120. Fingerprint sensor 120 can be a capacitive sensor. Alternatively, the fingerprint sensor 120 can be an electric field sensor.

Figure 2:
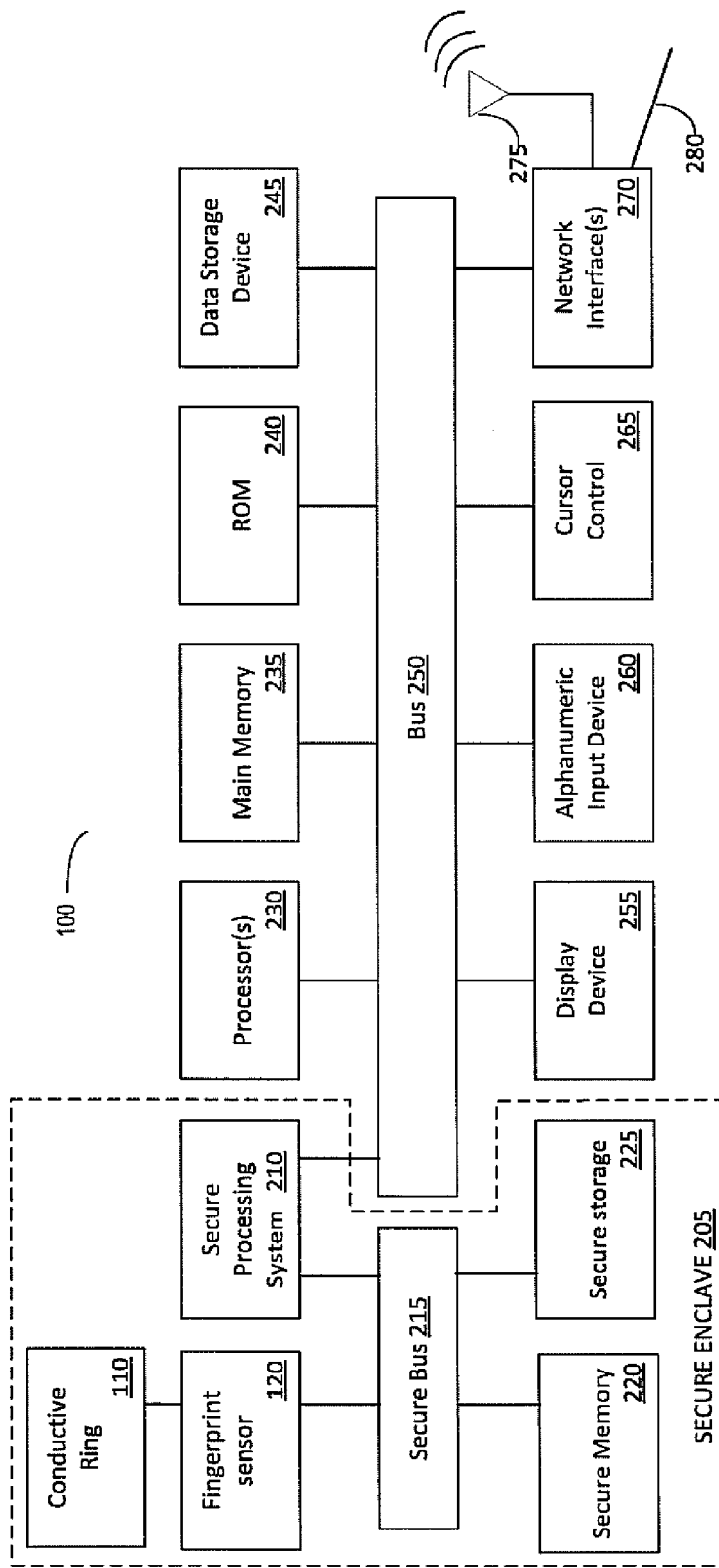
FIG. 2 illustrates a block diagram of components and subsystems of an exemplary electronic device for use with embodiments described herein.

FIG. 2 illustrates a block diagram of components and subsystems of an exemplary electronic device 100 according to some embodiments. The electronic device 100 illustrated in FIG. 2 is intended to represent a range of electronic devices (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The electronic device 100 of FIG. 2 typically operates as a client device, but may be used as client device and/or a server device.

The electronic device 100 includes a secure enclave 205 and other processing components. The secure enclave 205 (indicated by a dashed line) can include a fingerprint sensor 120, a secure processing system 210, a secure memory 220, and a secure storage 225. The elements within the secure enclave 205 can be each securely communicatively coupled to a secure bus 215. Fingerprint sensor 120 can alternatively, or in addition, be securely communicatively coupled to secure processing system 210. Fingerprint sensor 120 can incorporate conductive ring 110, or conductive ring 110 can be communicatively coupled to fingerprint sensor 120. In an embodiment, conductive ring 110 can be coupled to secure bus 215. Alternatively, conductive ring 110 can be coupled to bus 250. Conductive ring 110 can detect that a human finger or a manufactured key device has contacted the conductive ring 110. Detecting a human finger or a manufactured key device contacting the conductive ring can be used to trigger scanning of fingerprint sensor 120 and generating of fingerprint sensor data. The fingerprint sensor data may be read directly into the secure processing system 210 or the sensor data may be stored in secure memory 220 and accessed by secure processing system 210 via secure bus 215. Fingerprint sensor 120 can include encryption logic. Fingerprint sensor 120 and secure processing system 210 can have a shared cryptographic key in common that is used to encrypt fingerprint sensor data from the fingerprint sensor 120 to the secure processing system 210. Secure processing system 210 can process the fingerprint sensor data to determine whether the sensor data represents a human fingerprint or a manufactured key device. In an embodiment, fingerprint sensor 120 can determine whether the sensor data represents a human finger or a manufactured key device. Secure processing system 210 can further process sensor data by filtering the sensor data and applying signal processing techniques to determine a fingerprint template when the secure processing system 210 determines that the sensor data represents a fingerprint. Secure processing system 210 can further determine a key value from the sensor data when the secure processing system determines that the sensor data represents a manufactured key device. After processing the sensor data, secure processing system 210 can store any or all of a fingerprint template generated from the sensor data, a key value of a manufactured key device determined from the sensor data, or a cryptographic key generated from the value, in the secure storage 225. Secure processing system 210 is further communicatively coupled to bus 250. Other than the processing system 210, components and subsystems that are coupled to bus 250 cannot access components and subsystems within the secure enclave 205.

Electronic device 100 further includes bus 250 or other communication device to communicate information, and processor(s) 230 coupled to bus 250 that may process information.

While electronic device 100 is illustrated with a single processor, electronic device 100 may include multiple processors and/or co-processors 230. In an embodiment, secure processing system 210 can be a co-processor to processor(s) 230 or a secure core of processor(s) 230.

Electronic device 100 further may include random access memory (RAM) or other dynamic storage device 235 (referred to as main memory), coupled to bus 250 and may store information and instructions that may be executed by processor(s) 230. Main memory 235 may also be used to store temporary variables or other intermediate information during execution of instructions by processor(s) 230.

Electronic device 100 may also include read only memory (ROM) and/or other static storage device 240 coupled to bus 250 that may store static information and instructions for processor(s) 230. Data storage device 245 may be coupled to bus 250 to store information and instructions. Data storage device 245 may be a flash memory or a magnetic disk or optical disc and can be internal or may be coupled externally to electronic device 100.

Electronic device 100 may also be coupled via bus 250 to display device 255, such as a cathode ray tube (CRT), liquid crystal display (LCD), or light emitting diode (LED) to display information to a user. Electronic device 100 can also include an alphanumeric input device 260, including alphanumeric and other keys, which may be coupled to bus 250 to communicate information and command selections to processor(s) 230. Another type of user input device is cursor control 265, such as a touchpad, a mouse, a trackball, or cursor direction keys to communicate direction information and command selections to processor(s) 230 and to control cursor movement on display 255. The functionality of display device 255, alphanumeric input device 260 and cursor control 265 may be combined in a single device such as a touch screen display.

Electronic device 100 further may include one or more network interface(s) 270 to provide access to a network, such as a local area network. Network interface(s) 270 may include, for example, a wireless network interface having antenna 275, which may represent one or more antenna(e). Electronic device 100 can include multiple wireless network interfaces such as a combination of WiFi, Bluetooth and cellular telephony interfaces. Network interface(s) 270 may also include, for example, a wired network interface to communicate with remote devices via network cable 280, which may be, for example, an Ethernet cable, a coaxial cable, a fiber optic cable, a serial cable, or a parallel cable.

In one embodiment, network interface(s) 270 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 270 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 3:
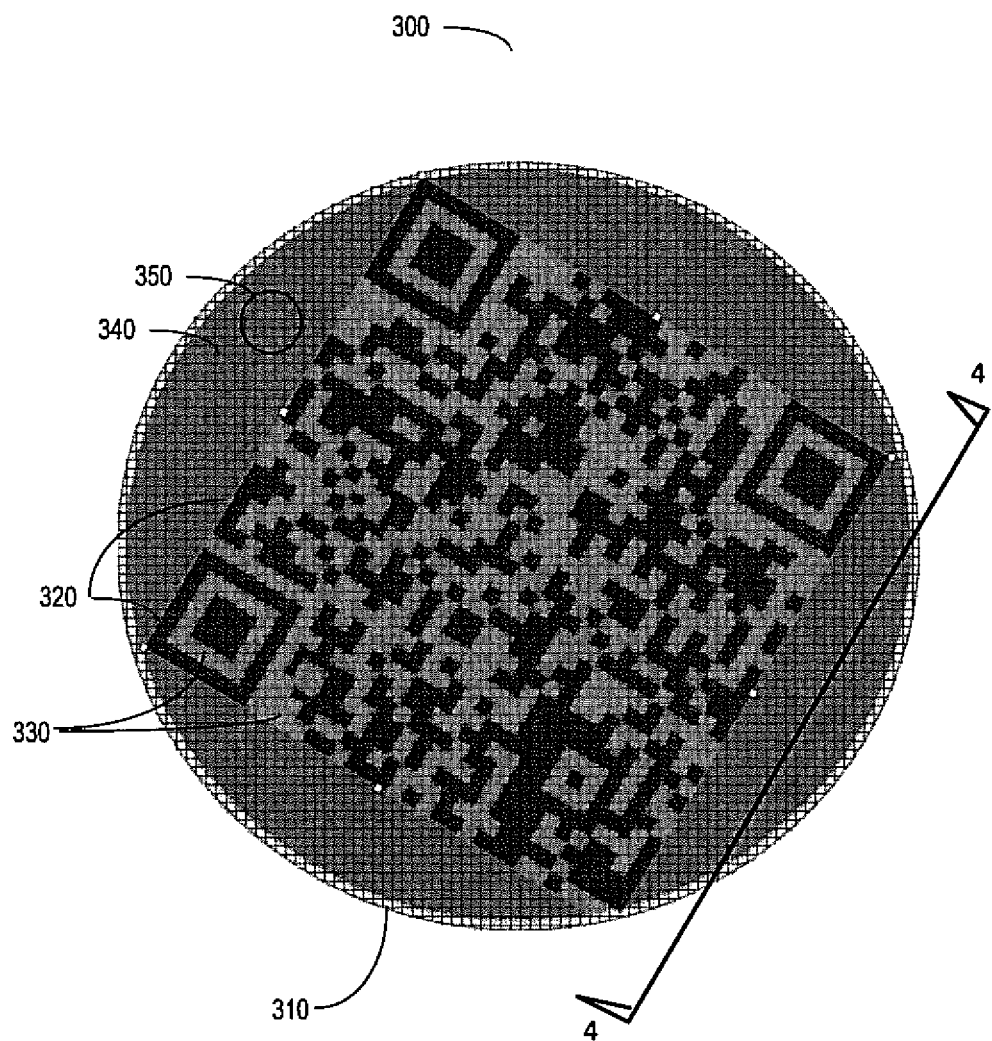
FIG. 3 illustrates a top view of an embodiment of a manufactured key device.
Figure 4:
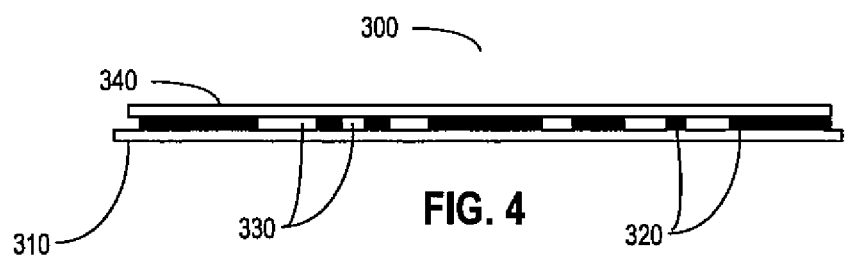
FIG. 4 illustrates a cross-sectional view of an embodiment of a manufactured key device.

FIGS. 3 and 4 illustrates a top view and cross-sectional view, respectively, of an embodiment of a manufactured key device 300. Manufactured key device 300 can include a conductive substantially planar substrate 310 ("substrate") having a key value encoded thereon. In an embodiment, the substrate 310 can be made from a non-conductive material. In such an embodiment, a portion of conductive material can be applied to the surface of the substrate 310, configured in a ring at or near the perimeter of the substrate 310. The portion of conductive material can be configured to contact the fingerprint sensor conductive ring 110. Conductive material can further be applied to the surface of the substrate 310 to provide a conductive region substantially underneath, or comprising, the key value encoded on the surface of the substrate 310. Additional conductive material can be applied to the surface of the substrate 310 to create an electrically conductive path between the conductive ring portion and the conductive area that is substantially underneath, or comprising, the physical encoding of the key value. In an embodiment, the conductive material can cover substantially all of the surface area of the substrate 310.

The physical encoding of the key value on the substrate 310 may take the form of etching the surface of substantially planar substrate 310 or applying a conductive ink or other deposition process of conductive material such that the top surface of the substrate 310 comprises conductive raised portions 320 and recessed or lower portions 330. Recessed portions 330 can be non-conductive, but this need not be the case. Raised portions 320 can contact fingerprint sensor 120 when the key device 300 is positioned for reading by the fingerprint sensor 120. In an embodiment, the raised portions 320 and recessed portions 330 can comprise a QR code that encodes a key value. Other encodings of patterns of raised portions 320 and recessed portions 330 that can encode a key value can include a bar code, an image of a fingerprint, a graphical image, an alphanumeric string, etc. In an embodiment, raised portions 320 can be conductive and recessed portions 330 can be non-conductive, with both portions 320 and 330 having a substantially same height or thickness with respect to the substantially planar substrate 310. The raised portions 320 can encode a key value. The substantially planar substrate 310, and portions 320 and 330, can further be covered by a conductive opaque layer 340 that visually obscures the encoding of the portions 320 and 330 so that portions 320 and 330 cannot be optically scanned or visually seen. In an embodiment, the opaque layer can be non-conductive. The opaque layer 340 adds security by making it difficult or impossible to improperly acquire the key value of a key device by observing or photographing the device key 300. In an embodiment, conductive opaque layer 340 can further include a grid 350 of non-conductive barriers that, in effect, isolate conductive portions of the conductive opaque layer in a pixel-like way. The grid 350 can prevent conductive portions 320 from "bleeding" across the recessed or non-conductive portions 330 while the conductive portions 320 conduct through the conductive opaque layer. In effect, the non-conductive grid 350 in the conductive layer 340 can cause the conductive raised portions 320 to be "pixel-like" or more focused as the conductive portions pass charge through the conductive, opaque layer 340. Although grid 350 is illustrated as a small circular area, it is understood that the cross-hatch pattern shown on FIG. 3 indicates that grid 350 can extend to the full bounds of substantially planar substrate 310. In an embodiment, grid 350 can be limited to areas of the substantially planar substrate 310 that contain raised portions 320 and recessed portions 330 which encode the key value on the substantially planar substrate 310. The manufactured key device 300 can be configured to be received by the fingerprint sensor 120 and configured to contact the conductive ring 110 when the fingerprint sensor 120 receives the key device 300. The conductive ring 110 can be used to detect that the key device 300 has been received by the fingerprint sensor 120, and therefore the fingerprint sensor 120 can begin scanning the key device 300.

Figure 5:
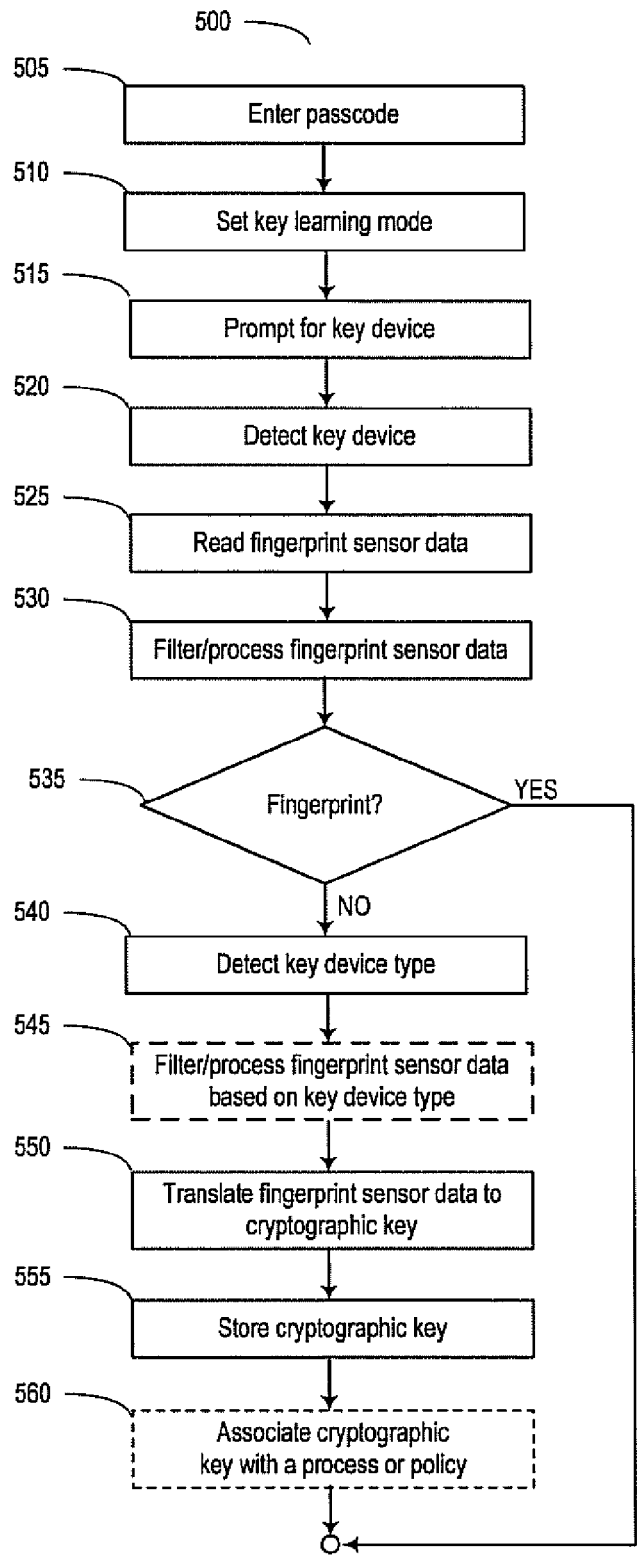
FIG. 5 illustrates a flow chart of a method of an electronic device learning a key value of a manufactured key device.

FIG. 5 illustrates a flow chart of a method 500 of learning a key value of a manufactured key device 300 by an electronic device 100 having a fingerprint sensor 120.

In operation 505, the user gains full access to the electronic device by entering a pass code, a password, or other acceptable manner of authentication supported by the electronic device 100.

In operation 510, the user can set the electronic device 100 into a learning mode. In an embodiment, the learning mode can be implemented within the secure enclave 205.

The secure enclave can make a system call outside the secure enclave 205, via an Application Program Interface (API), to prompt the user to set the electronic device 100 into a learning mode. However, since the fingerprint sensor 120 is securely coupled to the secure processing system 210, this need not be the case.

In operation 515, the user can be prompted to position the manufactured key device 300 into the fingerprint sensor 120. In an embodiment, the secure enclave 205 can make a system call via an API to prompt the user to position the manufactured key device 300 into the fingerprint sensor 120. In an embodiment, the user prompt to position the manufactured key device 300 into the fingerprint sensor 120 can be made automatically, in response to the electronic device 100 being put into a key learning mode in operation 510.

In operation 520, the conductive ring 110 can detect the presence of the key device 300, indicating that the key device 300 can now be scanned. The conductive ring 110 may not be able to determine whether the user placed a key device 300 onto the fingerprint sensor 120 or whether the user placed a human finger onto the fingerprint sensor 120.

In operation 525, the fingerprint sensor 120 can be read. Sensor data received from the fingerprint sensor 120 can be securely transmitted from the fingerprint sensor 120 to the secure processing system 210 for processing. In an embodiment, the fingerprint sensor 120 and the secure processing system 210 share a cryptographic key that can be used to establish a secure channel between the fingerprint sensor 120 and the secure processor 210. In an embodiment, the fingerprint sensor 120 and secure processing system 210 can be paired with the cryptographic key during manufacturing of the electronic device 100 such that the cryptographic key shared between the fingerprint sensor 120 and the secure processing system 210 is distinct from a key value encoded on a key device 300.

In operation 530, secure processing system 210 may filter or process the fingerprint sensor data to remove artifacts from the sensor data.

In operation 535, the secure processing system 210 can determine whether the sensor data represents a human fingerprint, or whether the sensor data was read from a key device 300.

If the sensor data was read from a manufactured key device 300, then in operation 540 the secure processing system 210 can determine a key device type of the key device 300. For example the key device 300 may have been encoded with a QR code that is orientation-independent. The manufactured key device 300 may alternatively be encoded with an alphanumeric string, optionally comprising one or more orientation markers to facilitate reading the alphanumeric string. The manufactured key device 300 may still alternatively be encoded with a graphical image, optionally comprising one or more orientation markers. In an embodiment, a key device type may comprise a hybrid of multiple key device types, e.g., an alphanumeric key value plus a graphical image, which can be determined by the secure processing system 210 by analyzing the sensor data.

In operation 545, the sensor data may optionally be further filtered or processed. In an embodiment, the further filtering or processing can be performed using techniques that are specific to the key device type.

In operation 550, the secure processing system 210 can determine a key value from the sensor data. Determining a key value can further comprise determining a cryptographic key from the sensor data. In an embodiment, a key value can be determined from the sensor data, and a cryptographic key can be determined from the key value. Whether the cryptographic key is determined from the sensor data, or the cryptographic key is determined from the key value which is determined from the sensor data, can be selectable based upon a tag encoded in the key device or based upon a user selection. For example, the cryptographic key can be determined using the key value as seed for an algorithm that determines a cryptographic key.

In operation 555, the secure processing system 210 can store the sensor data, the key value, and cryptographic key in a secure storage 225 within the secure enclave 205. The user may optionally enter a human-readable textual name to associate with the stored data so that the user may later refer to the key device 300 and its key value by name.

In operation 560, the user may optionally associate a key device with a policy that controls how the electronic device 100 may be used with reference to the key device 300 and its associated key value and cryptographic key.

Figure 6:
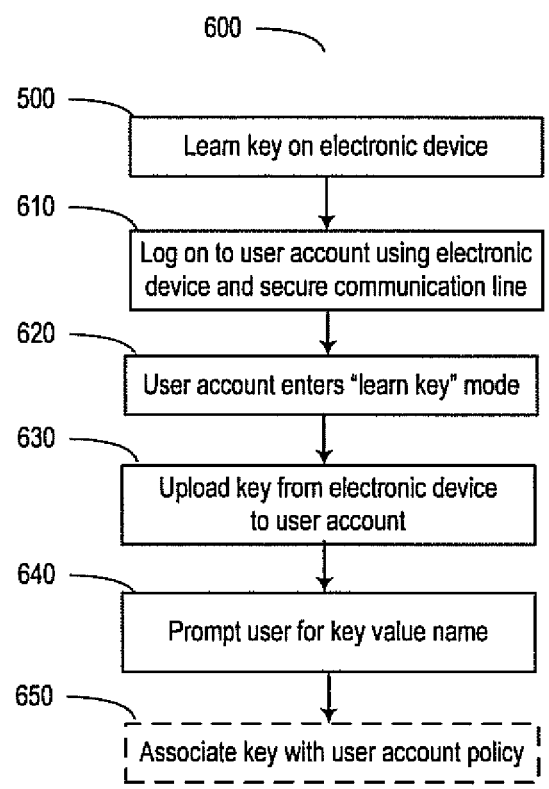
FIG. 6 illustrates a flow chart of a method of registering a key value of a manufactured key device with a user account.

FIG. 6 illustrates a flow chart of a method 600 for registering a key value of a manufactured key device 300 with a user account.

In operation 500, a user causes an electronic device 100 to learn the key value from the key device in accordance with the operations described in FIG. 5, above.

In operation 610, the user logs on to her user account 730 using the electronic device 100 that has learned the key value in operation 500. In an embodiment, the user logs on to her user account using a secure communication line between the electronic device 100 and the user account 730. The secure communication line can be established using a cryptographic key determined from the key value learned in operation 500.

In operation 620, the electronic device 100 can instruct the user account 730 to enter into a mode for learning the new key value learned by the electronic device 100 in operation 500. In an embodiment, the user can select on option on her electronic device 100 to instruct the user account 730 to enter in the mode for learning a new key. In another embodiment, as a part of learning a new key value on the electronic device 100 in operation 500, the electronic device 100 can prompt the user as to whether the user wants to register the key value learned in operation 500 with a user account 730. In such an embodiment, the electronic device, can automatically log on to the user account 730. Alternatively, the electronic device 100 can prompt the user for a user account 730, user name and password, to access the user account. The electronic device 100 can then detect that the electronic device 100 has logged on to the user account, and can instruct the user account 730 to enter into a mode to learn a new key value. Prompts to the user can be implemented using calls to an appropriate API.

In operation 630, the electronic device 100 can upload the key value to the user account.

In operation 640, the user account 730 can prompt the user of electronic device 100 to enter a human readable name for easily identifying the key value uploaded in operation 630. The key name can be used to facilitate a user identifying a specific key value. In an embodiment, the electronic device 100 can prompt the user to enter a key name, which the electronic device can upload to the user account. In another embodiment, the user account can generate the prompt for the user to enter a key name and the electronic device can display the prompt, receive the key name, and upload the key name to the user account. The user account can then associate the key value, the key name, the electronic device 100, and the user account and store the key value, key name, and associations. In another embodiment, the electronic device 100 can upload the key name entered by the user in operation 555 of method 500, as described with reference to FIG. 5, above.

In operation 650, the user can optionally associate the key value with one or more user account policies. For example, the user may want the key value associated with a policy that limits the amount of online purchases per day to a specified value. The user may also want the key value associated with a policy that specifies the user services that an electronic device may access when the electronic device presents the key value to the user account 730. For example, the user may not want an electronic device 100 using this key value to be able to access a backup or restore service that may overwrite the user's backed-up personal information or download the user's personal information in a restore process.

Figure 7:
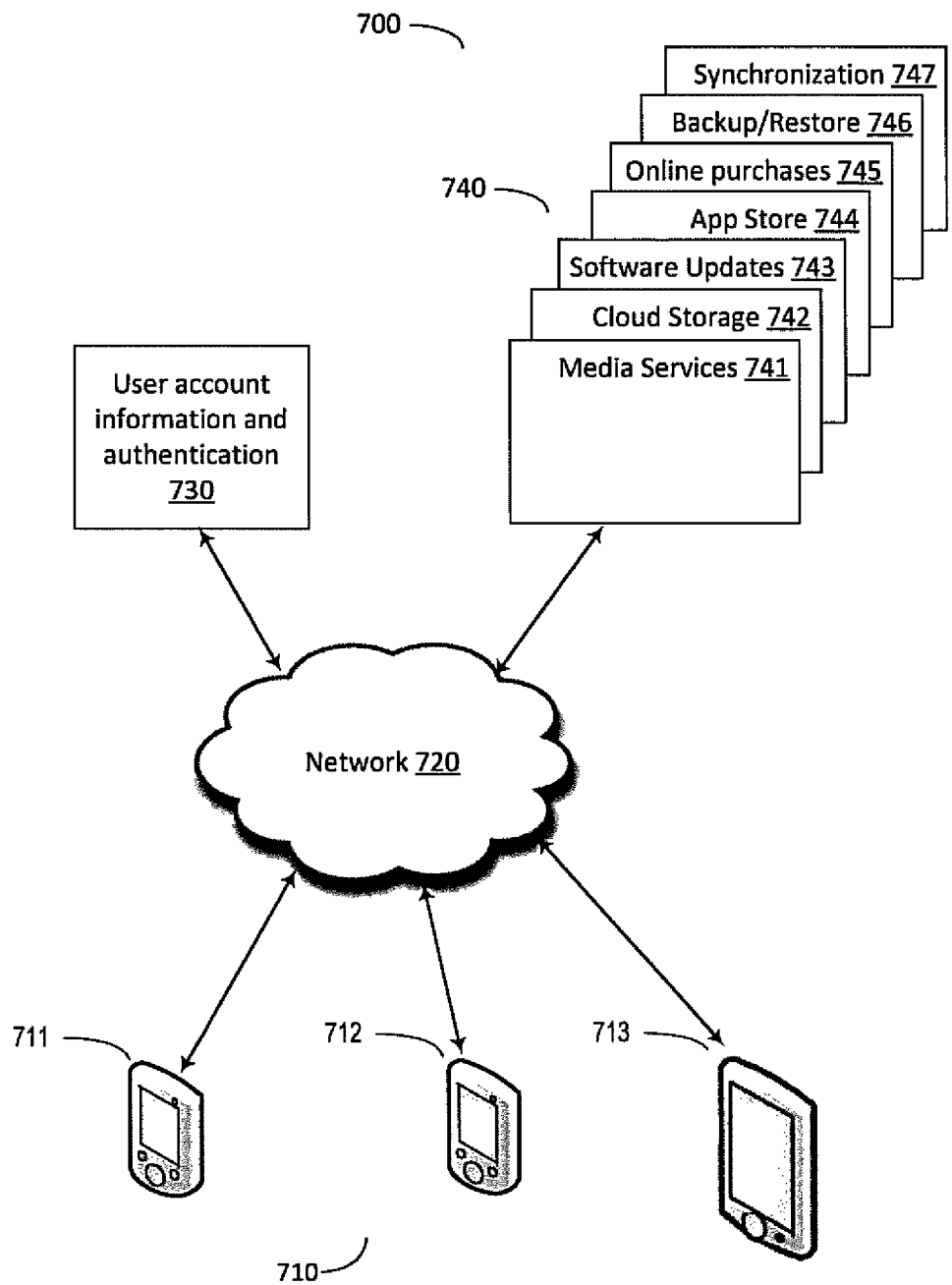
FIG. 7 illustrates an overview of a system for securely providing services to one or more electronic devices of a user via a user account.

FIG. 7 illustrates an overview of a system 700 for securely providing services to a user having a user account 730.

A user may have multiple electronic devices 710, such as mobile phones 711 and 712 or table computer 713. Electronic devices 710 can access a user account 730, and account services 740, via network 720.

Network 720 can be the Internet, a cellular network, a WiFi network, a local area network, a public switched telephone network, or any combination of networks known in the art.

User account 730 can include user account information. User account information can include one or more stored key values associated with the user account 730, one or more policies associated with the one or more key values, a list of the user's electronic devices 100 that are registered with the account, a list of users that are authorized to access the user account 730 and their respective authentication and identification information. User account information may further include billing information, address and contact information, et al.

Account services 740 can include media services 741, cloud storage 742, software updates 743, an application store 744, online purchasing 745, a backup and restore service 746, and a synchronization service 747. Services 741 through 747 are examples of online services 740 that may be accessible via a single user account 730 and are not intended to be limiting or an exhaustive list. Media services 741 can include, e.g., iTunes®, NetFlix®, Hulu®, Amazon® Cloud, or other media services. Cloud storage 742 can include Apple® iCloud® and Amazon® Cloud, for example.

Figure 8:
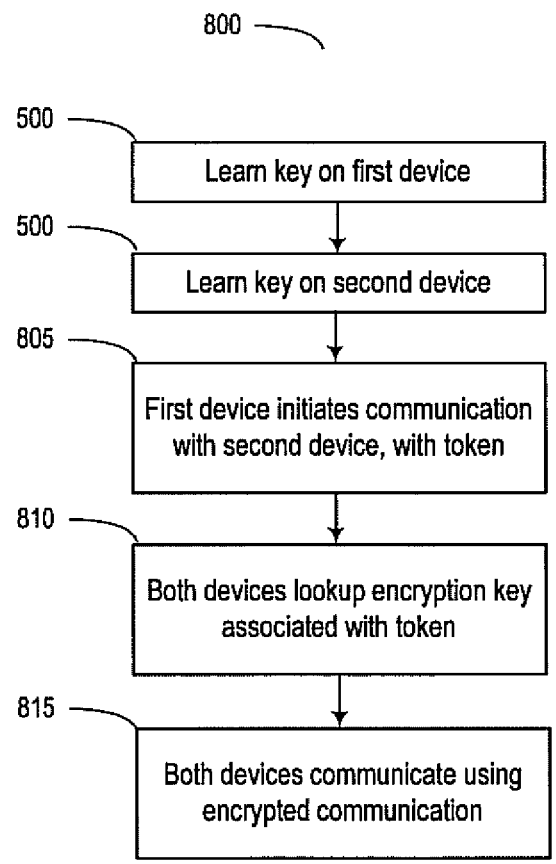
FIG. 8 illustrates a flow chart of a method of establishing secure communications between two electronic devices.

FIG. 8 illustrates a flow chart of a method 800 for establishing a secure communications channel between two electronic devices 100. A user can have two or more electronic devices 100 and a manufactured key device 300 having a key value. Secure communications between the two electronic devices 100 can include establishing a secure data channel between the two electronic devices 100, encrypting texts or emails between the two electronic devices 100, encrypting attachments to encrypted or unencrypted emails or text messages, or establishing a secure telephone call by encrypting the voice data within cellular packets exchanged between the two electronic devices 100.

In operation 500, a first electronic device 100 of the user learns the key value of key device 300 in accordance with the operations described with reference to FIG. 5, above. A second electronic device 100 of the user also learns the key value of the key device 300 in accordance with the operations described with reference to FIG. 5, above. At the completion of operations 500, both the first and second electronic devices 100 have learned the key value of the key device 300 and can use the key value, or a cryptographic key determined from the key value, to establish secure communications. In an embodiment, the key value or cryptographic key, can comprise a private key shared by the two electronic devices 100. The following operations will be described in terms of the key value being synonymous with the cryptographic key. It is understood that the key value can, itself, be a cryptographic key, and that alternatively a cryptographic key can be determined from the key value.

In operation 805, the first electronic device 100 initiates communication with the second electronic device 100 by passing a token to the second electronic device 100 identifying which learned, shared key value will be used in establishing secure communication between the first and second electronic devices 100. The token can be a textual key name associated with the shared key value, or other identifier that both the first and second electronic devices 100 can use to uniquely identify the particular shared key value to use.

In operation 810, the first and second electronic devices 100 can look up the shared key value associated with the token.

In operation 815, the first and second devices utilize the key value, or a cryptographic key determined from the key value, to encrypt communications between the first and second communication devices.

Figure 9:
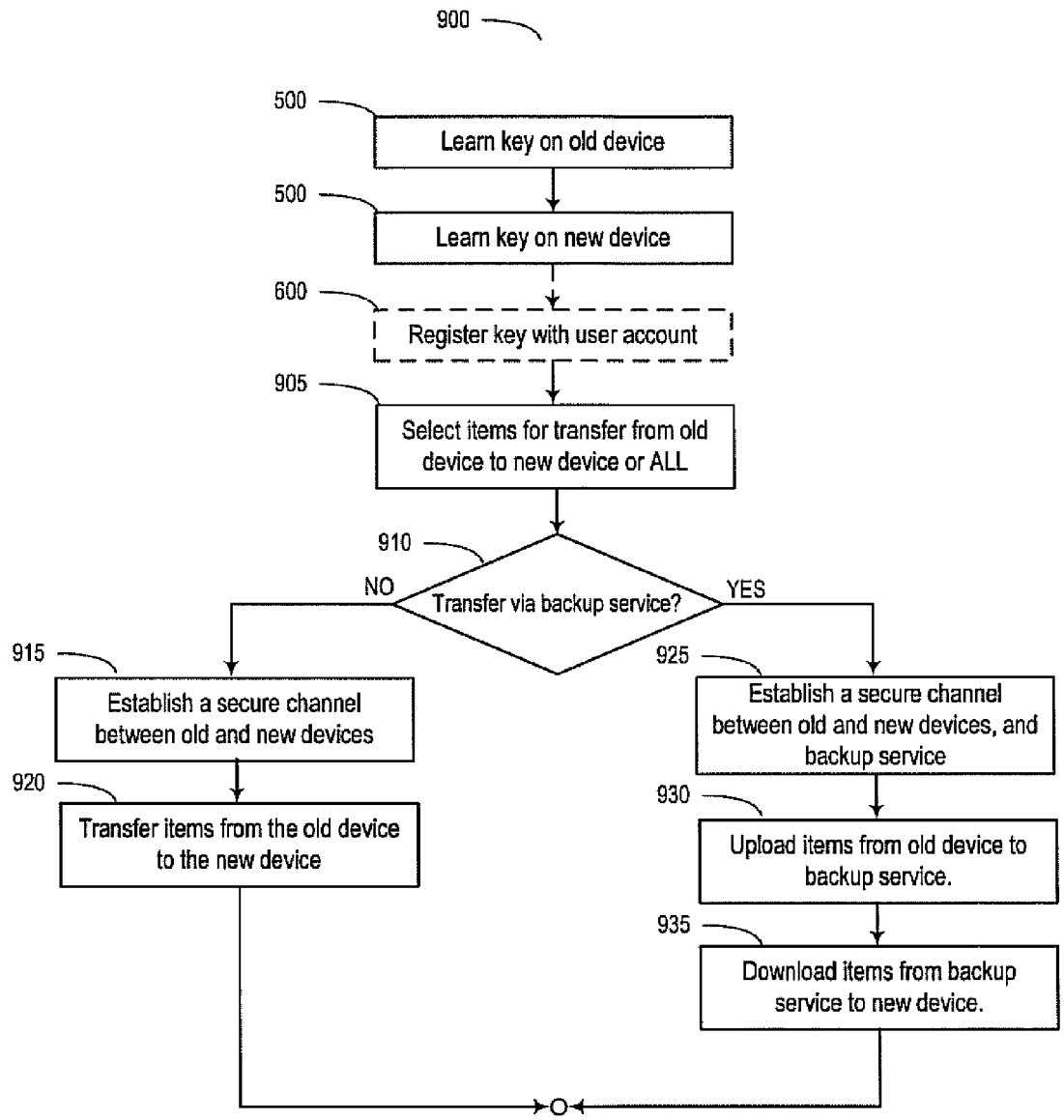
FIG. 9 illustrates a flow chart of a method for securely provisioning a new electronic device from an old electronic device, optionally via a backup and restore service.

FIG. 9 illustrates a flow chart of a method 900 of using a first, or old or existing, electronic device 100 to securely provisioning a second, or new, electronic device 100, optionally via a backup and restore service 746. A user may want to upgrade their old (existing) electronic device 100 with a new electronic device 100 and provision the new electronic device 100 with applications, data, or configuration settings from the old electronic device 100. Utilizing method 900, a user can perform the provisioning of the new electronic device 100 without the assistance of a store technician. The provisioning can be direct, via a secure communications channel from the old electronic device 100 to the new electronic device 100. Alternatively, the new electronic device 100 can be provisioned indirectly by utilizing a backup and restore service 746 as an intermediary. The backup service and restore service 746 can back-up the old electronic device 100 prior to, or concurrently with, provisioning the new electronic device 100. The new electronic device 100 can be provisioned the from the backup of the old electronic device by using a restore process of the backup and restore service 746. In an embodiment, the old electronic device 100 and the new electronic device 100 can be synchronized using a synchronization service 747.

In operations 500, the new and old electronic devices 100 learn a key value from a manufactured key device 300 in accordance with operations described with reference to FIG. 5, above. It is understood that the old electronic device 100 may have already learned the key value from the manufactured key device 300 before the user obtained the new electronic device 100.

In operation 600, the user can register the key value of the manufactured key device 300 that will be used to establish secure communications between the old electronic device 100 and the new electronic device 100, in accordance with the operations described with reference to FIG. 6, above. If the backup and restore service 746 is used to facilitate the provisioning of the new electronic device 100, then the registered key value can be used to securely access the backup and restore service 746. If the registered key value is associated with a user account policy, then the user account policy will determine whether the backup and restore service 746 can be used to provision the new electronic device 100.

In operation 905, the user can select specific items from the old electronic device 100 for provisioning the new electronic device 100. For example, a user might select contacts, calendar items, documents, pictures, and text messages for provisioning the new electronic device 100, but not select music or email messages because they are already stored and accessible on a remote server by a media service 741 or email server, respectively. Alternatively, a user may select all items on the old electronic device 100 for provisioning the new electronic device 100. In an embodiment, the selection of which items to transfer to the new electronic device 100 can be made automatically. In an embodiment in which the backup and restore service 746 is used, the selection of which items to transfer to the new electronic device 100 can be made automatically by the backup and restore service 746. In an embodiment, a user may opt to provision the new electronic device 100 directly from a previous backup of the old electronic device 100 performed by the backup and restore service 746.

In operation 910, a user can select whether the backup and restore service 746 will be to be used to facilitate the provisioning of the new electronic device 100.

If the backup and restore service 746 is not used to provision the new electronic device 100, then in operation 915 a secure communication channel can be established between the old and new electronic devices 100 as described above with reference to FIG. 8.

In operation 920, the old electronic device 100 can then securely transfer the items selected in operation 905 from the old electronic device 100 to the new electronic device 100 thereby provisioning the new electronic device 100.

If the backup and restore service 746 will be used to facilitate provisioning of the new electronic device 100, then in operation 925 the old electronic device 100 and the new electronic device 100 can establish a secure communication channel with the user account 730 and backup and restore service 746.

In operation 930, the items selected for transfer from the old electronic device 100 to the new electronic device 930 can be securely uploaded from the old electronic device 100 to the backup and restore service 746. If the user has opted to provision the new electronic device 100 from a previous backup of the old electronic device 100, then operation 930 can be skipped.

In operation 935, the new electronic device 100 can download and store the selected items from the backup and restore service 746, thereby provisioning the new electronic device 100.

Figure 10:
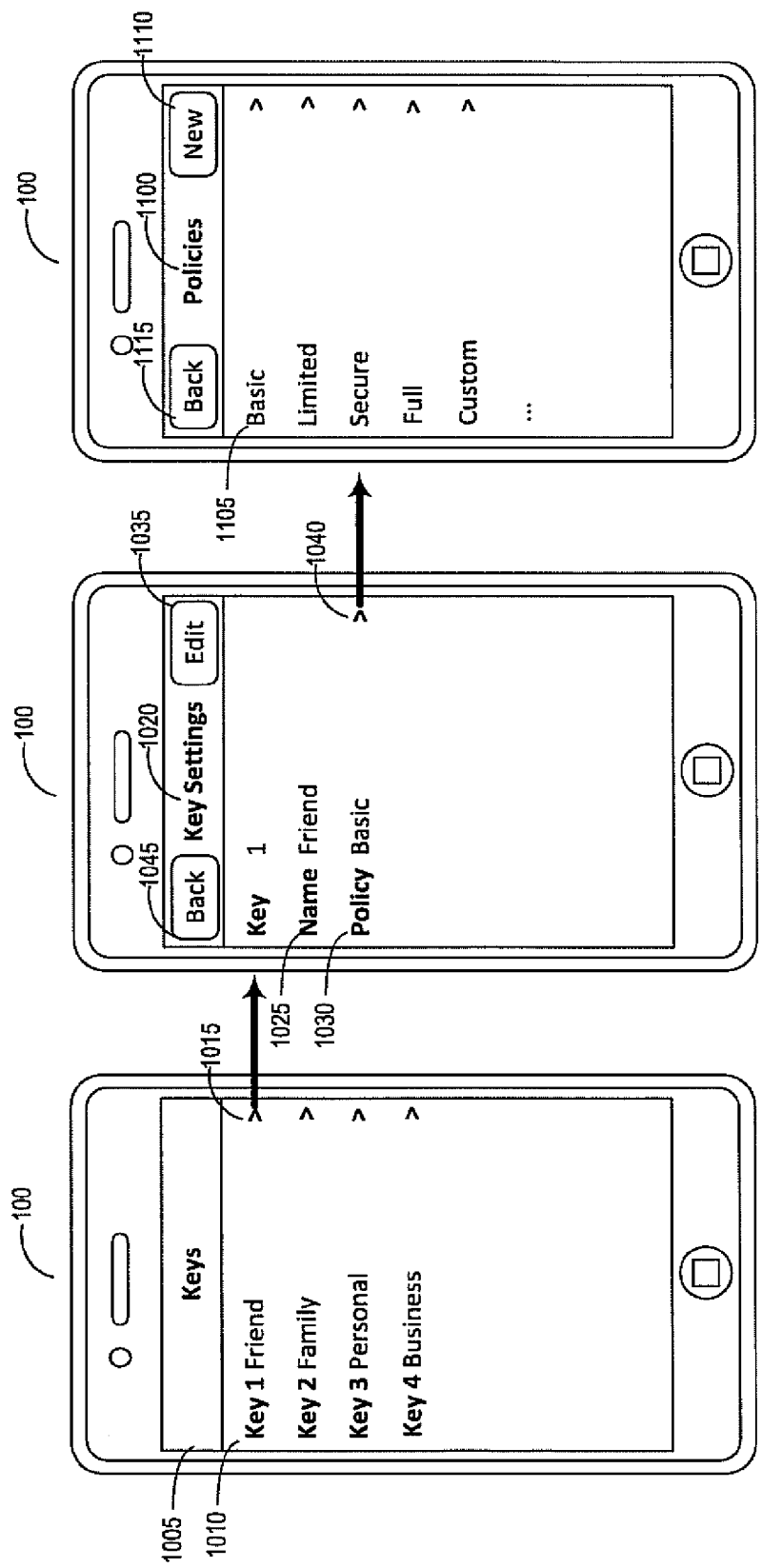
FIG. 10 illustrates associating a manufactured device key with one or more policies.

FIG. 10 illustrates associating a key value of a manufactured device key 300 with one or more policies for using an electronic device 100. As indicated under the Keys heading 1005, an electronic device 100 may learn and store multiple key values 1010 for different purposes. For example, a user may have a key value 1010 that is used for a friend, another for a family member, yet another for personal use, and still another key value 1010 for business use. If a user lends her electronic device 100 to a friend, she can also giver her friend the manufactured device key device 300 corresponding to, e.g., the Key 1 Friend that determines how the friend can use the electronic device 100. To use the electronic device 100, the friend can place the manufactured key device 300 on the fingerprint sensor 120 to gain access to the electronic device 100. The electronic device 100 recognizes the key value as Key 1 Friend, and electronic device 100 configures itself for operation in accordance with the access policy defined for Key 1 Friend.

To configure one or more policies for a key value 1010, in an embodiment a user can select arrow keypad 1015 corresponding to a learned key value to view Key Settings 1020 for the corresponding key value, such as Key 1. Key Settings 1020 for Key 1 can be edited by pressing the Edit keypad 1035 to enter Edit mode for Key 1. In Edit mode, a key value can be named in Name field 1025 for easy identification. A policy 1030 can be associated with Key 1 can be by pressing arrow keypad 1040 to view Policies 1100. From Policies 1100, to return to Key Settings 1020, the user can press the Back keypad 1115. Selecting, creating, and editing policies 1105 is described with reference to FIGS. 11-13, below.

Figure 11:
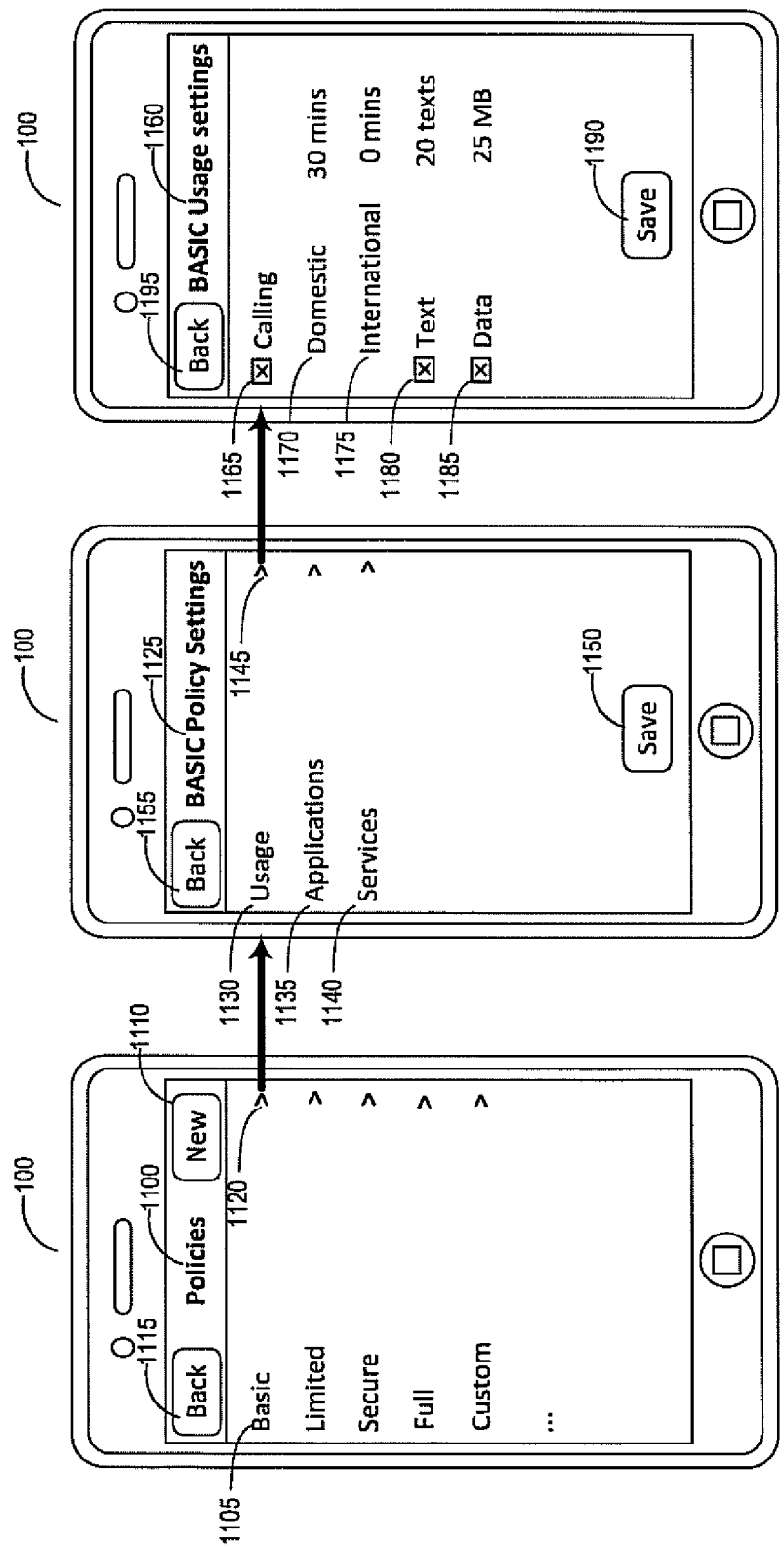
FIG. 11-13 illustrate configuring a policy associated with a manufactured device key.
Figure 12:
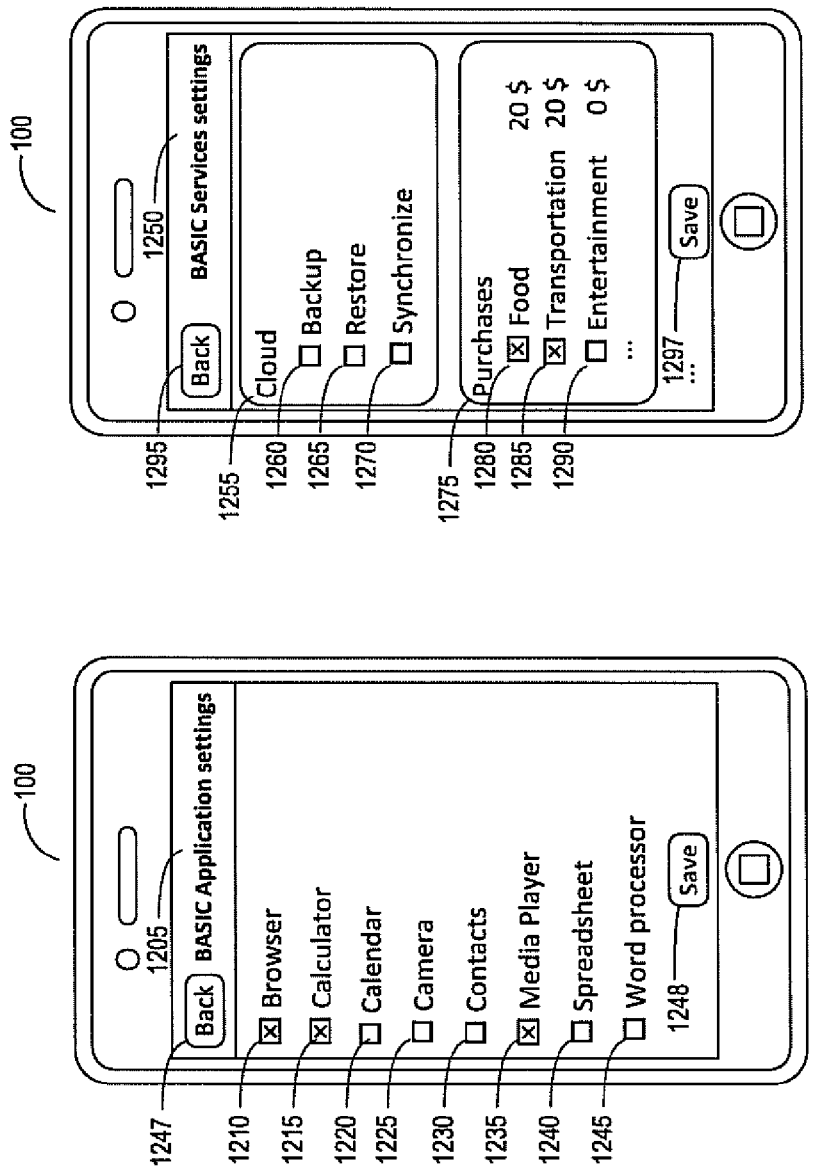
Figure 13:
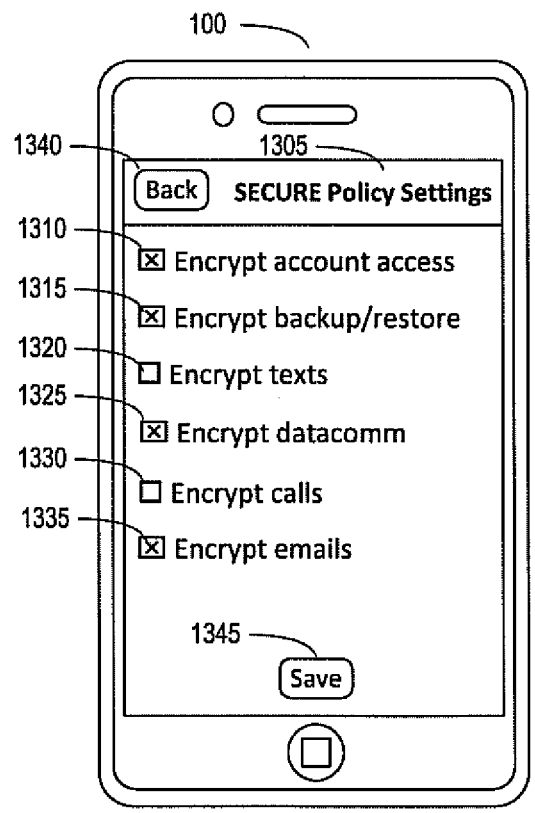

FIGS. 11-13 illustrate configuring a policy 1105 that can be associated with a key value of a manufactured device key 300. The embodiments described below are exemplary and not intended to be limiting.

FIG. 11 illustrates exemplary types of policies 1100, example settings for a policy 1125 for a Basic policy 1105 and an example configuration of usage settings 1160 for a Basic policy 1105.

In an embodiment, a predefined set of policies 1105 may be pre-installed on an new electronic device 100 before a user receives the new electronic device 100. Policies 1100, whether predefined or user-defined, can be named, configured, and saved for association with one or more key values. Some example policies 1105 are Basic, Limited, Secure, Full, and Custom. A user can create and configure a new policy by pressing the New keypad 1110. A user can exit the Policies 1100 screen by pressing the Back keypad 1115.

A Basic device access policy 1105 may be configured for, e.g., the kind of electronic device access that the user would grant to a friend that wanted to temporarily borrow the user's electronic device 100. Basic policy settings 1125 can include configuring device usage limits 1130, access to applications 1135, and control of access to services 1140 that are accessed via a user account 730. Policy settings for a policy can be saved using the Save 1150 keypad. In an embodiment, pressing an arrow keypad 1145 allows editing of, e.g., Basic Usage settings 1160. The user may permit her friend to make calls 1165 on the electronic device 100, but choose to limit calls to 30 minutes of domestic calling 1170 and no international calling 1175, to prevent incurring unintended international calling fees. The user may also permit a friend a limited number of text messages 1180, such as 20 texts, and permit a small amount of data usage 1185 such as 25 megabytes (25 MB). The Basic Usage settings 1160 can be saved by pressing keypad 1190. The user can exit the Basic Usage settings 1160 by pressing the Back 1195 keypad.

FIG. 12 illustrates example of configuring settings that control access to Applications 1205 and access to user account services 1250 for a Basic policy 1105. Continuing with the example of a Basic policy associated with a key value that a user will use when lending her electronic device 100 to a friend, the user may want allow her friend to access a web browser application 1210, a calculator 1215, and a media player 1235, but not the user's personal calendar 1220, camera 1225, personal contacts 1230, spreadsheets 1240 or word processor 1245. The user can save this configuration by pressing the Save 1248 keypad, or exit the Edit mode for Application settings 1205 for the Basic policy by pressing the Back 1247 keypad.

Similarly, if the friend has lost her purse, the user may want to permit her friend limited access to user account services such as purchases 1275, e.g. a limited amount of food 1280 and transportation 1285 purchases, to get home safely. However, the user may not want her friend to be able to access cloud services 1255 such as backup 1260, restore 1265, or device synchronization 1270 that may affect the data integrity of the user's electronic device 100 or expose personal information stored by cloud services 1255. The user can save the Services settings 1250 by pressing the Save 1297 keypad, or exit the Edit mode for Services settings 1250 for the Basic policy by pressing the Back 1295 keypad.

FIG. 13 illustrates example policy settings for a Secure policy 1305. A Secure policy may be associated with a key value that is used for, e.g., secure communications between electronic devices that share a key value that has the Secure policy associated with the key value. The Secure policy 1305 may also be used between an electronic device 100 and a user account 730 that controls access to account services 740.

When accessing the user's user account 730, and user account services 740 that are accessible via the user account 730, a user may want to encrypt access to the user account 1310. The user may also want to encrypt data transfer 1315 when using the backup and restore service 746. A user may also want to encrypt all data communications 1325 and emails 1335 when using a key value that has the Secure policy associated with the key value. The user can save the Secure policy settings by pressing the Save 1345 keypad, or exit Edit mode for the Secure policy settings by pressing the Back 1340 keypad.

Figure 14:
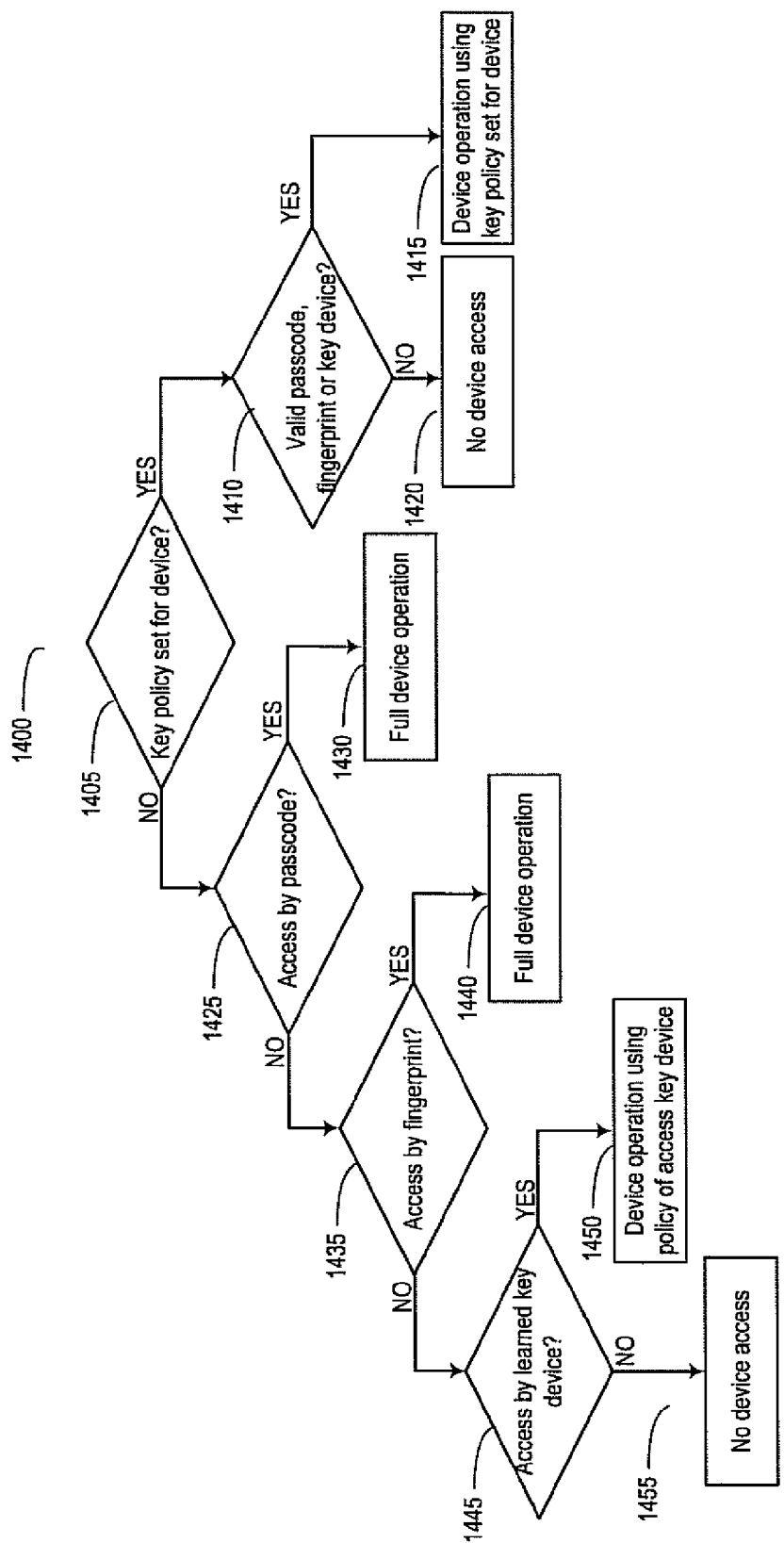
FIG. 14 illustrates a method of determining an access control level for an electronic device.

FIG. 14 illustrates a method 1400 of determining an access control level for an electronic device 100. Once an electronic device has learned a key value from a key device 300, the key value can be associated with a policy that determines the operation of the electronic device 100 and services 740 that may be associated with a user account 730. The policy can be set as the default operating policy for the electronic device 100. The following description assumes that the electronic device has already learned a key value from a key device 300.

In operation 1405, it is determined whether a policy has been associated with a key value and whether the policy has been set as the default operating policy set for the electronic device 100.

If a policy has been associated with a key value learned by the electronic device 100, and the policy has been set as the default policy for operating the electronic device 100, then in operation 1410 it is determined whether the user has presented a valid passcode, fingerprint or key device to access the electronic device 100.

If a default policy has been set for the electronic device 100, and the user presents a valid passcode, fingerprint, or key device 300 then in operation 1415, the user is granted access to the electronic device 100 and the device will operate in accordance with the default policy.

If a default policy has been set for the electronic device and the user does not present a valid passcode, fingerprint, or key device 300, then in operation 1420, the user will not be granted access to the electronic device 100.

In an embodiment, an administrator of an electronic device 100 can set a key value or passcode that permits full access to the electronic device 100 so that the default policy can be overridden by using the administrator's key device or passcode to access the device. Otherwise, the operating mode for the electronic device is in accordance with the default policy associated with the learned key value. As an example, a parent or employer may configure a default policy for operating an electronic device 100 and give their child or employee, respectively, a passcode and key device to utilize the electronic device in accordance with the default policy. The parent or employer may still retain an overriding key value or passcode that permits full access to the electronic device 100.

If no default policy has been set for operating the electronic device 100, then in operation 1425 it is determined whether the user of the device has entered a valid passcode to access the electronic device 100. If so, then in operation 1430, the user is given full access to the electronic device 100.

If no default policy has been set for operating the electronic device 100, and access has not been attempted by entering a valid passcode, then in operation 1435 it is determined whether a user has presented a valid fingerprint at the fingerprint sensor. If so, the user is given full access to the electronic device 100.

If no default policy has been set for operating the electronic device 100, and access has not been attempted by passcode or fingerprint, then in operation 1445 it is determined whether the user has presented a valid key device 300 at the fingerprint sensor 120, the key device 300 having a key value that was previously learned by the electronic device. If so, then in operation 1450 the device operation is configured according the a policy associated with the key device presented to the fingerprint sensor 120. Otherwise, in operation 1455, access to the electronic device is denied.

It will be understood that both fingerprints and passcodes may have a fallback number of attempts. If the electronic device 100 does not recognize the fingerprint presented for accessing the electronic device 100, then the electronic device 100 may permit, e.g., three (3) additional attempts to access the electronic device 100 using a fingerprint. Similarly, if a passcode is entered for accessing the electronic device 100 then the electronic device 100 may permit, e.g., up to five (5) attempts to access the electronic device 100 using a passcode. The key device 300 does not need fallback attempts because the key device 300 has a very high repeatability rate. In an embodiment, an electronic device access method can include a fallback number or attempts for accessing the electronic device using a key device 300.

Figure 15:
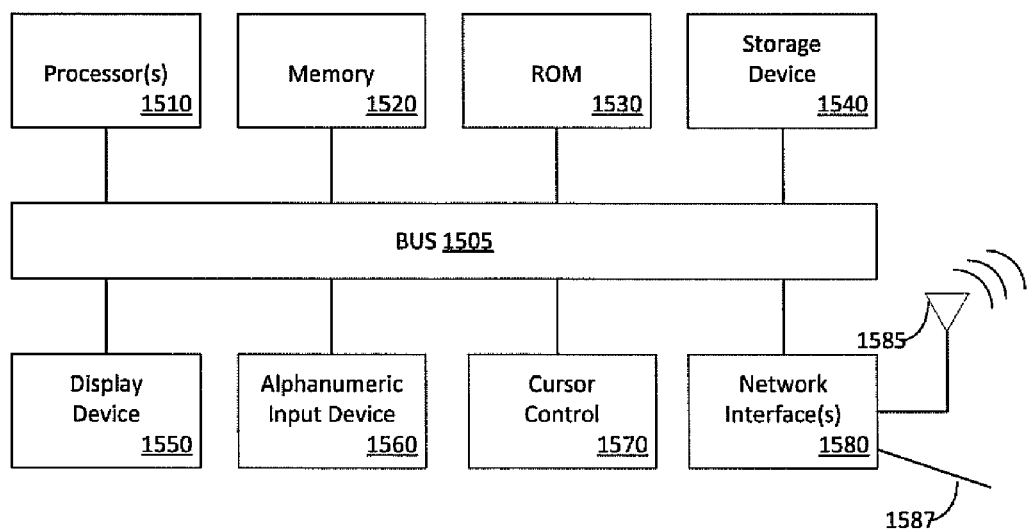
FIG. 15 illustrates a block diagram of a computing system for use in some embodiments disclosed herein.

FIG. 15 is a block diagram of one embodiment of a computing system 1500. The computing environment 100, described above, can be implemented using one or more computing systems 1500.

The computing system illustrated in FIG. 15 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 15 may be used to provide a client device and/or a server device.

Computing system 1500 includes bus 1505 or other communication device to communicate information, and processor 1510 coupled to bus 1505 that may process information.

While computing system 1500 is illustrated with a single processor, computing system 1500 may include multiple processors and/or co-processors 1510. Computing system 1500 further may include random access memory (RAM) or other dynamic storage device 1520 (referred to as main memory), coupled to bus 1505 and may store information and instructions that may be executed by processor(s) 1510. Main memory 1520 may also be used to store temporary variables or other intermediate information during execution of instructions by processor 1510.

Computing system 1500 may also include read only memory (ROM) and/or other static storage device 1540 coupled to bus 1505 that may store static information and instructions for processor(s) 1510. Data storage device 1540 may be coupled to bus 1505 to store information and instructions. Data storage device 1540 such as flash memory or a magnetic disk or optical disc and corresponding drive may be coupled to computing system 1500.

Computing system 1500 may also be coupled via bus 1505 to display device 1550, such as a cathode ray tube (CRT) or liquid crystal display (LCD), to display information to a user. Computing system 1500 can also include an alphanumeric input device 1560, including alphanumeric and other keys, which may be coupled to bus 1505 to communicate information and command selections to processor(s) 1510. Another type of user input device is cursor control 1570, such as a touchpad, a mouse, a trackball, or cursor direction keys to communicate direction information and command selections to processor(s) 1510 and to control cursor movement on display 1550.

Computing system 1500 further may include one or more network interface(s) 1580 to provide access to a network, such as a local area network. Network interface(s) 1580 may include, for example, a wireless network interface having antenna 1585, which may represent one or more antenna(e). Computing system 1500 can include multiple wireless network interfaces such as a combination of WiFi, Bluetooth and cellular telephony interfaces. Network interface(s) 1580 may also include, for example, a wired network interface to communicate with remote devices via network cable 1587, which may be, for example, an Ethernet cable, a coaxial cable, a fiber optic cable, a serial cable, or a parallel cable In one embodiment, network interface(s) 1580 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1580 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 16:
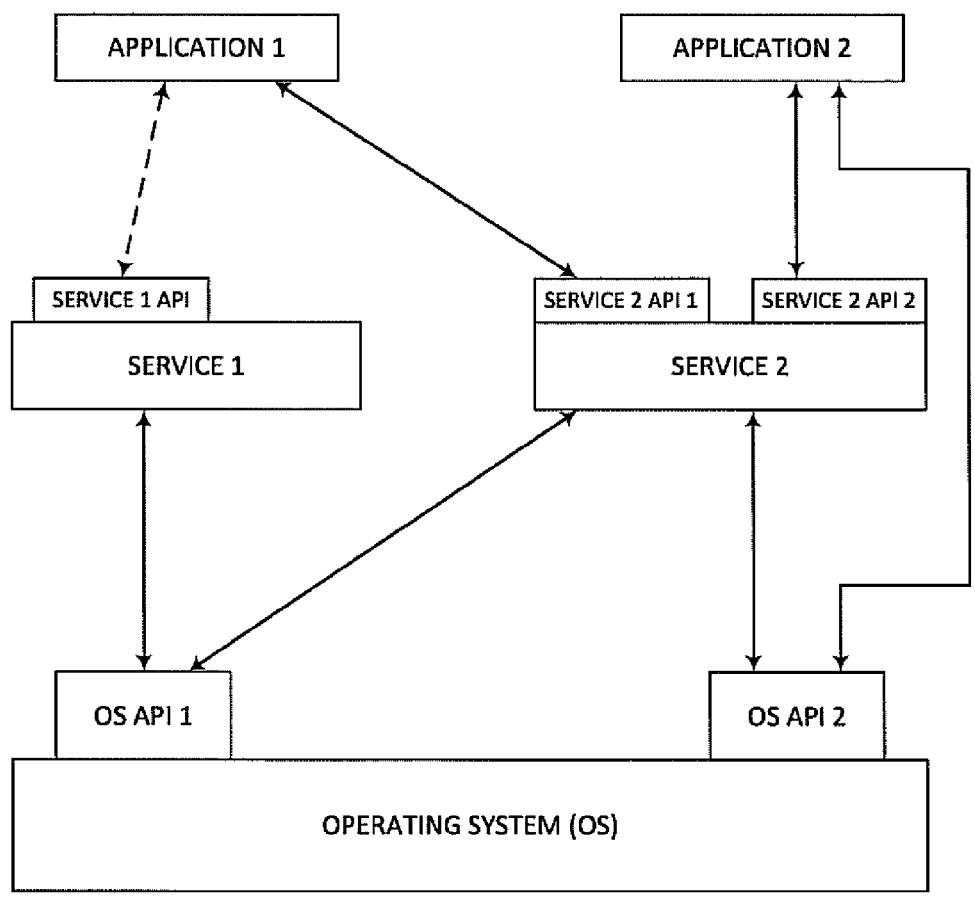
FIG. 16 illustrates an exemplary embodiment of a software stack usable in some embodiments of the invention.

In FIG. 16 ("Software Stack"), an exemplary embodiment, applications can make calls to Services A or B using several Service APIs and to Operating System (OS) using several OS APIs. A and B can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both OS API 1 and OS API 2, Application 2 makes calls to and receives returned values from OS API 2.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An electronic device, comprising:
   a biometric sensor;
   a communications module;
   a secure processing system, securely communicatively coupled to the biometric sensor, wherein the secure processing system is programmed with executable instructions that, when executed, perform the operations:
   receiving sensor data from the biometric sensor via the secure communicative coupling between the biometric sensor and the secure processing system;
   determining whether the sensor data was generated by a biometric input or a key pattern of a manufactured key device, wherein the key pattern encodes a cryptographic value, wherein the manufactured key device includes a substantially planar substrate comprising a conductive material that encodes the key pattern;
   determining a cryptographic key from the sensor data, when the sensor data was generated by the key pattern, wherein the biometric sensor and the secure processing system share a common cryptographic key and the common cryptographic key is distinct from the cryptographic key that is determined from the sensor data;
   determining an electronic device access policy based, at least in part, on whether the sensor data was generated by a biometric input or the key pattern of the manufactured device, wherein a different electronic device access policy is determined for a biometric input than for the key pattern of the manufactured device.

2. The electronic device of claim 1, wherein the biometric sensor comprises a fingerprint sensor, and the biometric input comprises a fingerprint.

3. The electronic device of claim 1, the operations further comprising:
   scanning the biometric sensor in response to detecting the presence of the manufactured key device by the biometric sensor.

4. The electronic device of claim 1, wherein the operations further comprise:
   establishing a secure communication channel between the electronic device and a user account service utilizing the cryptographic key determined from the sensor data, wherein the cryptographic key determined from the sensor data was previously registered with the user account service.

5. The electronic device of claim 4, wherein the operations further comprise:
   presenting, by the electronic device, to the user account service, the cryptographic key determined from the sensor data; and
   accessing, by the electronic device, a service associated with cryptographic key determined from the sensor data.

6. The electronic device of claim 4, wherein the operations further comprise:
   presenting, by the electronic device, to the user account service, the cryptographic key determined from the sensor data; and
   receiving, by the electronic device, a denial of access to a service of the user account service, wherein the service is not associated with the cryptographic key determined from the sensor data.

7. The electronic device of claim 1, wherein the secure processing system comprises a secure subsystem of a processing system having one or more processors.

8. The electronic device of claim 1, wherein the substantially planar substrate is configured to be received by the biometric sensor.

9. A non-transitory computer-readable medium comprising processor-executable instructions that, when executed, perform a method on an electronic device having a biometric sensor which is securely communicatively coupled to a secure processing system comprising:
receiving sensor data from the biometric sensor via the secure communicative coupling between the biometric sensor and the secure processing system;
determining whether the sensor data was generated by a biometric input or a key pattern of a manufactured key device, wherein the key pattern encodes a cryptographic value;
determining a cryptographic key from the sensor data, when the sensor data was generated by the key pattern, wherein the biometric sensor and the secure processing system share a common cryptographic key and the common cryptographic key is distinct from the cryptographic key that is determined from the sensor data;
determining an electronic device access policy based, at least in part, on whether the sensor data was generated by a biometric input or the key pattern of the manufactured device, wherein a different electronic device access policy is determined for a biometric input than for the key pattern of the manufactured device.

10. The medium of claim 9, wherein the biometric sensor comprises a fingerprint sensor and the biometric input comprises a fingerprint.

11. The medium of claim 9, the method further comprising:
triggering a scan of the biometric sensor in response to detecting the presence of the manufactured key device by the biometric sensor.

12. The medium of claim 9, the method further comprising:
establishing a secure communication channel between the electronic device and a user account service utilizing the cryptographic key determined from the sensor data, wherein the cryptographic key determined from the sensor data was previously registered with the user account service.

13. The medium of claim 12, the method further comprising:
presenting, by the electronic device, to the user account service, the cryptographic key determined from the sensor data; and
accessing, by the electronic device, a service associated with cryptographic key determined from the sensor data.

14. The medium of claim 12, the method further comprising:
presenting, by the electronic device, to the user account service, the cryptographic key determined from the sensor data; and
receiving, by the electronic device, a denial of access to a service offered by the user account service, wherein the service is not associated with the cryptographic key determined from the sensor data.

15. A computer-implemented method practiced on an electronic device, the method comprising:
receiving sensor data from a biometric sensor via a secure communicative coupling between the biometric sensor and a secure processing system;
determining whether the sensor data was generated by a biometric input or a key pattern of a manufactured key device, wherein the key pattern encodes a cryptographic value;
determining a cryptographic key from the sensor data, when the sensor data was generated by the key pattern, wherein the biometric sensor and the secure processing system share a common cryptographic key and the common cryptographic key is distinct from the cryptographic key that is determined from the sensor data;
determining an electronic device access policy based, at least in part, on whether the sensor data was generated by a biometric input or the key pattern of the manufactured device, wherein a different electronic device access policy is determined for a biometric input than for the key pattern of the manufactured device.

16. The method of claim 15, wherein the biometric sensor comprises a fingerprint sensor and the biometric input comprises a fingerprint.

17. The method of claim 15, further comprising:
triggering a scan of the biometric sensor in response to detecting the presence of the manufactured key device by the biometric sensor.

18. The method of claim 15, further comprising:
establishing a secure communication channel between the electronic device and a user account service utilizing the cryptographic key determined from the sensor data, wherein the cryptographic key determined from the sensor data was previously registered with the user account service.

19. The method of claim 18, further comprising:
presenting, by the electronic device, to the user account service, the cryptographic key determined from the sensor data; and
accessing, by the electronic device, a service associated with cryptographic key determined from the sensor data.

20. The method of claim 18, further comprising:
presenting, by the electronic device, to the user account service, the cryptographic key determined from the sensor data; and
receiving, by the electronic device, a denial of access to a service offered by the user account service, wherein the service is not associated with the cryptographic key determined from the sensor data.

* * * * *